US010280760B2

(12) United States Patent
Joshi et al.

(10) Patent No.: US 10,280,760 B2
(45) Date of Patent: May 7, 2019

(54) TURBINE ENGINE ASSEMBLY AND METHOD OF ASSEMBLING THE SAME

(71) Applicant: General Electric Company, Schenectady, NY (US)

(72) Inventors: Narendra Digamber Joshi, Guilderland, NY (US); Christian Lee Vandervort, Voorheesville, NY (US); Krishan Lal Luthra, Guilderland, NY (US); Ronald Scott Bunker, West Chester, OH (US); Joel Meier Haynes, Niskayuna, NY (US); Venkat Eswarlu Tangirala, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 510 days.

(21) Appl. No.: 14/870,853

(22) Filed: Sep. 30, 2015

(65) Prior Publication Data

US 2017/0089205 A1    Mar. 30, 2017

(51) Int. Cl.
*F02C 1/00*    (2006.01)
*F02C 3/34*    (2006.01)
(Continued)

(52) U.S. Cl.
CPC .............. *F01D 5/186* (2013.01); *F01D 25/32* (2013.01); *F02C 3/34* (2013.01); *F02C 6/003* (2013.01); *F02C 7/185* (2013.01); *F23C 9/08* (2013.01); *F23R 3/002* (2013.01); *F02C 1/005* (2013.01); *F02C 1/08* (2013.01); *F05D 2260/213* (2013.01); *F05D 2260/61* (2013.01); *F05D 2300/6033* (2013.01);
(Continued)

(58) Field of Classification Search
CPC .... F02C 3/34; F02C 1/005; F02C 1/08; F23R 2900/03041; F23R 2900/03042
See application file for complete search history.

(56) References Cited

U.S. PATENT DOCUMENTS 4,528,811 A * 7/1985 Stahl ..................... F01K 23/064
60/39.52
7,966,829 B2    6/2011 Finkenrath et al.
(Continued)

OTHER PUBLICATIONS

Doctor et al., "Gasification Combined Cycle: Carbon Dioxide Recovery Transport, and Disposal", Energy Conversion and Management, vol. 34, No. 9-11, pp. 1113-1120, 1993.

*Primary Examiner* — Gerald L Sung
*Assistant Examiner* — Rene D Ford
(74) *Attorney, Agent, or Firm* — GE Global Patent Operation; John Darling

(57) ABSTRACT

A turbine assembly is provided. The turbine assembly includes a gas turbine engine including at least one hot gas path component formed at least partially from a ceramic matrix composite material. The turbine assembly also includes a treatment system positioned to receive a flow of exhaust gas from the gas turbine engine. The treatment system is configured to remove water from the flow of exhaust gas to form a flow of treated exhaust gas, and to channel the flow of treated exhaust gas towards the at least one hot gas path component. The at least one hot gas path component includes a plurality of cooling holes for channeling the flow of treated exhaust gas therethrough, such that a protective film is formed over the at least one hot gas path component.

17 Claims, 3 Drawing Sheets

(51) Int. Cl.
  *F02C 1/08* (2006.01)
  *F01D 5/18* (2006.01)
  *F23R 3/00* (2006.01)
  *F02C 6/00* (2006.01)
  *F02C 7/18* (2006.01)
  *F23C 9/08* (2006.01)
  *F01D 25/32* (2006.01)

(52) U.S. Cl.
  CPC .............. *F23M 2900/05004* (2013.01); *F23N 2021/12* (2013.01); *F23R 2900/03041* (2013.01); *F23R 2900/03341* (2013.01); *Y02E 20/14* (2013.01); *Y02E 20/16* (2013.01)

(56) References Cited

U.S. PATENT DOCUMENTS

| 8,104,259 | B2 | 1/2012 | Joshi et al. | |
|---|---|---|---|---|
| 2004/0005216 | A1* | 1/2004 | Suzumura | F01D 11/08 |
| | | | | 415/173.3 |
| 2006/0112696 | A1 | 6/2006 | Lynghjem et al. | |
| 2006/0272331 | A1 | 12/2006 | Bucker et al. | |
| 2007/0283700 | A1* | 12/2007 | Gerendas | F23R 3/002 |
| | | | | 60/754 |
| 2008/0083226 | A1 | 4/2008 | Joshi et al. | |
| 2008/0104939 | A1 | 5/2008 | Hoffmann et al. | |
| 2008/0104958 | A1 | 5/2008 | Finkenrath et al. | |
| 2008/0134660 | A1 | 6/2008 | Finkenrath et al. | |
| 2010/0247292 | A1* | 9/2010 | Davis, Jr. | F01D 5/081 |
| | | | | 415/144 |
| 2010/0300109 | A1* | 12/2010 | Carroni | F23L 7/00 |
| | | | | 60/776 |
| 2011/0219778 | A1 | 9/2011 | Wijmans et al. | |
| 2012/0031101 | A1 | 2/2012 | Hoffmann et al. | |
| 2012/0167577 | A1 | 7/2012 | Pemmi et al. | |
| 2012/0247105 | A1 | 10/2012 | Nelson et al. | |
| 2013/0086917 | A1* | 4/2013 | Slobodyanskiy | F23R 3/28 |
| | | | | 60/773 |
| 2013/0152599 | A1 | 6/2013 | Minnear et al. | |
| 2013/0283808 | A1* | 10/2013 | Kolvick | F02C 7/18 |
| | | | | 60/772 |

* cited by examiner

TURBINE ENGINE ASSEMBLY AND METHOD OF ASSEMBLING THE SAME

BACKGROUND

The present disclosure relates generally to turbine assemblies and, more particularly, to systems and methods of film cooling hot gas path components formed from ceramic material.

Rotary machines, such as gas turbines, are often used to generate power with electric generators. Gas turbines, for example, have a gas path that typically includes, in serial-flow relationship, an air intake, a compressor, a combustor, a turbine, and a gas outlet. Compressor and turbine sections include at least one row of circumferentially-spaced rotating buckets or blades coupled within a housing. At least some known turbine engines are used in cogeneration facilities and power plants. Engines used in such applications may have high specific work and power per unit mass flow requirements. To increase operating efficiency, at least some known gas turbines may operate at increased temperatures.

At least some known hot gas path components in gas turbines are formed from ceramic material, which is generally capable of withstanding greater temperatures than metallic material. For example, ceramic matrix composites (CMCs) commonly include continuous fibers of silicon carbide embedded within a matrix material. Although CMC components offer higher temperature capability than metallic counterparts, CMC components are sometimes limited by environmental factors in which the CMC components operate. For example, in the presence of oxygen and water vapor, silicon carbide forms carbon dioxide and silicon hydroxide. The silicon hydroxide can cause recession and reduce the service life of the CMC components.

BRIEF DESCRIPTION

In one aspect, a turbine assembly is provided. The turbine assembly includes a gas turbine engine including at least one hot gas path component formed at least partially from a ceramic matrix composite material. The turbine assembly also includes a treatment system positioned to receive a flow of exhaust gas from the gas turbine engine. The treatment system is configured to remove water from the flow of exhaust gas to form a flow of treated exhaust gas, and to channel the flow of treated exhaust gas towards the at least one hot gas path component. The at least one hot gas path component includes a plurality of cooling holes for channeling the flow of treated exhaust gas therethrough, such that a protective film is formed over the at least one hot gas path component.

In another aspect, a combined-cycle power generation system is provided. The system includes a gas turbine engine including at least one hot gas path component formed at least partially from a ceramic matrix composite material. The system also includes a heat recovery steam generator positioned to receive a flow of exhaust gas discharged from the gas turbine engine. The heat recovery steam generator is configured to cool the flow of exhaust gas such that a flow of water condensed from the flow of exhaust gas and a flow of cooled exhaust gas is discharged from the heat recovery steam generator, and is configured to channel the flow of cooled exhaust gas towards the at least one hot gas path component. The at least one hot gas path component includes a plurality of cooling holes for channeling the flow of cooled exhaust gas therethrough, such that a protective film is formed over the at least one hot gas path component.

In yet another aspect, a method of assembling a turbine assembly is provided. The method includes positioning a treatment system to receive a flow of exhaust gas from a gas turbine engine. The gas turbine engine includes at least one hot gas path component formed at least partially from a ceramic matrix composite material and having a plurality of cooling holes defined therein. The treatment system is configured to remove water from the flow of exhaust gas to form a flow of treated exhaust gas. The method further includes coupling the treatment system in flow communication with the at least one hot gas path component such that a protective film is formed over the at least one hot gas path component when the flow of treated exhaust gas is channeled towards the at least one hot gas path component.

DRAWINGS

These and other features, aspects, and advantages of the present disclosure will become better understood when the following detailed description is read with reference to the accompanying drawings in which like characters represent like parts throughout the drawings, wherein.

Figure 1:
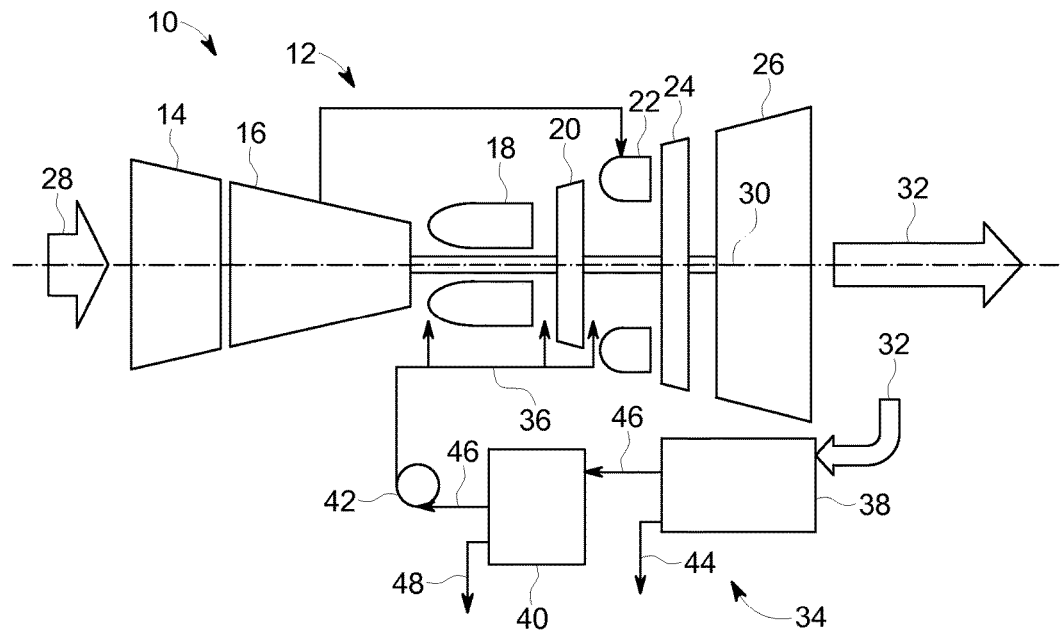
FIG. 1 is a schematic illustration of an exemplary turbine assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged.

Such ranges are identified and include all the sub-ranges contained therein unless context or language indicates otherwise.

Embodiments of the present disclosure relate to systems and methods of film cooling hot gas path components formed from ceramic matrix composite material. The system described herein facilitates treating exhaust gas from a gas turbine for subsequent use as a film cooling fluid for hot gas path components. More specifically, the turbine assembly operates such that constituents of the exhaust gas that may be harmful to ceramic matrix composite material are removed before being supplied as the film cooling fluid. For example, the film cooling fluid supplied to the hot gas path components is generally deficient in at least oxygen and water vapor. As such, utilizing such film cooling with ceramic matrix composite components enables the gas turbine to operate at higher firing temperatures and with a greater efficiency, while increasing the service life of the components.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

FIG. 1 is a schematic illustration of an exemplary turbine assembly 10. In the exemplary embodiment, turbine assembly 10 includes a gas turbine engine 12 that includes a low pressure compressor 14, a high pressure compressor 16, and a rich burn combustor 18 positioned downstream from high pressure compressor 16. Gas turbine engine 12 also includes a high pressure turbine 20 positioned downstream from rich burn combustor 18, a lean burn combustor 22 positioned downstream from high pressure turbine 20, a low pressure turbine 24 positioned downstream from lean burn combustor 22, and a power turbine 26 positioned downstream from low pressure turbine 24.

In operation, a flow of intake air 28 is channeled through low pressure compressor 14 and a flow of compressed air is channeled from low pressure compressor 14 to high pressure compressor 16. The compressed air is discharged from high pressure compressor 16 and channeled towards rich burn combustor 18, where the air is mixed with fuel and combusted to form a flow of combusted gas discharged towards high pressure turbine 20. As will be explained in more detail below, rich burn combustor 18 combusts an air-fuel mixture having excess fuel such that a flow of combusted gas having a depleted oxygen content is discharged therefrom. The flow of combusted gas discharged from rich burn combustor 18 drives high pressure turbine 20 about a centerline 30 of gas turbine engine 12, and the flow of combusted gas is then discharged towards lean burn combustor 22. Lean burn combustor 22 combusts the excess fuel in the flow of combusted gas such that a flow of exhaust gas 32, also having a depleted oxygen content, is channeled through turbines 24 and 26 and then discharged from gas turbine engine 12.

Turbine assembly 10 also includes a treatment system 34 positioned to receive at least a portion of the flow of exhaust gas 32 from gas turbine engine 12. Treatment system 34 facilitates removing water from the flow of exhaust gas 32 before channeling a flow of treated exhaust gas 36 towards gas turbine engine 12. More specifically, gas turbine engine 12 includes at least one hot gas path component (not shown) formed from a ceramic matrix composite material, as will be described in more detail below. In one embodiment, the flow of treated exhaust gas 36 is channeled towards gas turbine engine 12 to provide film cooling for at least one hot gas path component within gas turbine engine 12. As used herein, "hot gas path" refers to a flow path for combusted gas within gas turbine engine 12, and "hot gas path component" refers to any component that contacts the combusted gas within the hot gas path. For example, hot gas path components include at least one of, but not limited to, a combustor liner, a nozzle, a rotor blade, and a shroud.

In the exemplary embodiment, treatment system 34 includes a heat exchanger 38, a carbon dioxide removal unit 40 positioned downstream from heat exchanger 38, and an auxiliary compressor 42 positioned downstream from carbon dioxide removal unit 40. In operation, heat exchanger 38 cools the flow of exhaust gas 32 such that a flow of water 44 condensed from the flow of exhaust gas 32, and a flow of cooled exhaust gas 46 having a depleted water content is discharged from heat exchanger 38. The flow of cooled exhaust gas 46 is channeled towards carbon dioxide removal unit 40 for removing carbon dioxide from the flow of cooled exhaust gas 46, thereby discharging a flow of carbon dioxide 48 and the flow of cooled exhaust gas 46 having a depleted carbon dioxide content therefrom. The flow of cooled exhaust gas 46 is then channeled towards auxiliary compressor 42 to facilitate pressurizing the flow, thereby forming the flow of treated exhaust gas 36. As such, the oxygen, carbon dioxide, and water depleted flow of treated exhaust gas 36 is provided for cooling to ensure the at least one hot gas path component formed from ceramic matrix composite material does not prematurely degrade during operation of gas turbine engine 12. In one embodiment, heat exchanger 38 is a heat recovery steam generator. In addition, in an alternative embodiment, carbon dioxide removal unit 40 is either selectively operable or omitted from turbine assembly 10.

Figure 2:
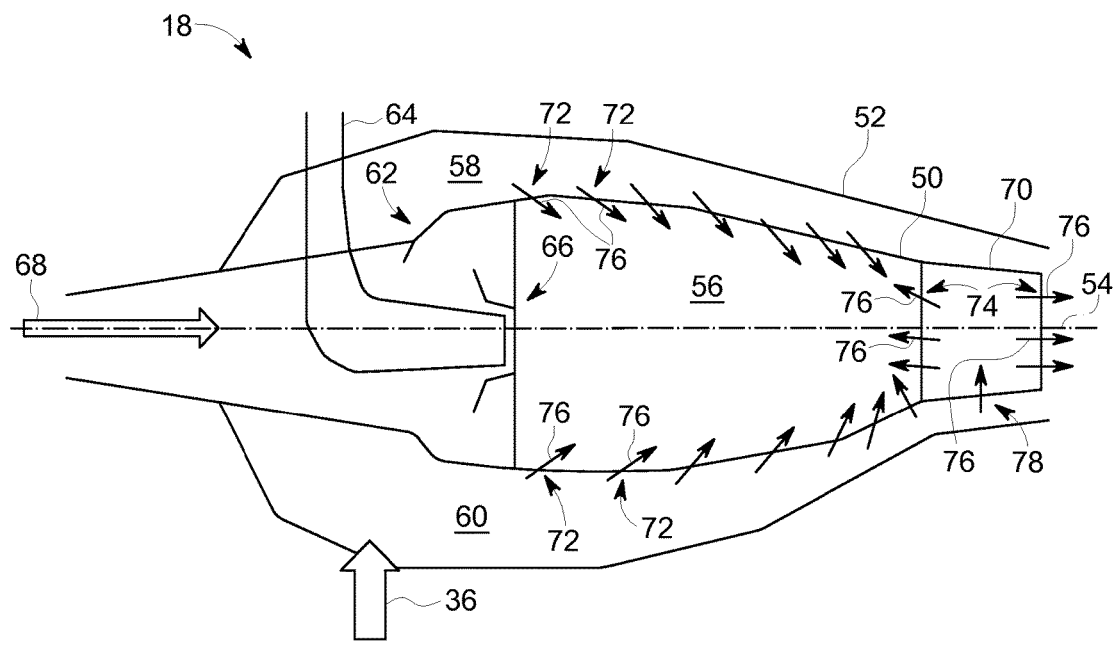
FIG. 2 is a schematic cross-sectional illustration of an exemplary rich burn combustor that may be used with the turbine assembly shown in FIG. 1.

FIG. 2 is a schematic cross-sectional illustration of rich burn combustor 18 that may be used with turbine assembly 10 (shown in FIG. 1). In the exemplary embodiment, rich burn combustor 18 includes a combustor liner 50 positioned radially inward from an outer combustor casing 52. Combustor liner 50 extends circumferentially about centerline 30 (shown in FIG. 1) such that a combustion chamber 56 is defined therein. Moreover, outer combustor casing 52 extends circumferentially about centerline 30 such that a radially outer passage 58 and a radially inner passage 60 are defined between combustor liner 50 and outer combustor casing 52. An annular dome assembly 62 extends between, and is coupled to, combustor liner 50, and a fuel nozzle 64 extends through outer combustor casing 52 to couple to dome assembly 62. A premixer 66 receives fuel from fuel nozzle 64 and receives compressed air 68 channeled from high pressure compressor 16 (shown in FIG. 1). The fuel and air are swirled and mixed together by premixer 66, and the resulting fuel-air mixture is discharged into combustion chamber 56. The fuel-air mixture is combusted and channeled past a nozzle 70 before being channeled towards high pressure turbine 20 (shown in FIG. 1). While shown as an annular-type combustor, it should be understood that cooling may be provided within turbine engines having other combustor architectures including can-annular and dump-type combustors.

As described above, the flow of treated exhaust gas 36 is channeled towards gas turbine engine 12 (shown in FIG. 1) to provide film cooling for hot gas path components. More specifically, in the exemplary embodiment, treated exhaust gas 36 is channeled through outer combustor casing 52 such that treated exhaust gas 36 flows within radially outer passage 58 and radially inner passage 60. In the exemplary embodiment, hot gas path components include combustor liner 50 and nozzle 70. Combustor liner 50 includes a plurality of first cooling holes 72 for channeling treated exhaust gas 36 therethrough, and nozzle 70 includes a plurality of second cooling holes 74 for channeling treated exhaust gas 36 therethrough. More specifically, first cooling holes 72 are coupled in flow communication with radially outer and inner passages 58 and 60 such that pressurized fluid jets 76 of treated exhaust gas 36 are discharged from first cooling holes 72 into combustion chamber 56, and such that a protective film (not shown) formed from pressurized fluid jets 76 is formed over combustor liner 50. In one embodiment, a nozzle inlet 78 couples second cooling holes 74 in flow communication with radially outer and inner passages 58 and 60. Pressurized fluid jets 76 discharged from second cooling holes 74 likewise form a protective film over nozzle 70. As such, treated exhaust gas 36 facilitates protecting combustor liner 50 and nozzle 70 from combustion gas having increased temperatures and, as described above, has a depleted water and oxygen content to ensure hot gas path components formed from ceramic matrix composite material do not prematurely degrade. As used herein, "protective film" refers to a layer of gas formed over respective components, and formed from the flow of treated exhaust gas, for example.

Figure 3:
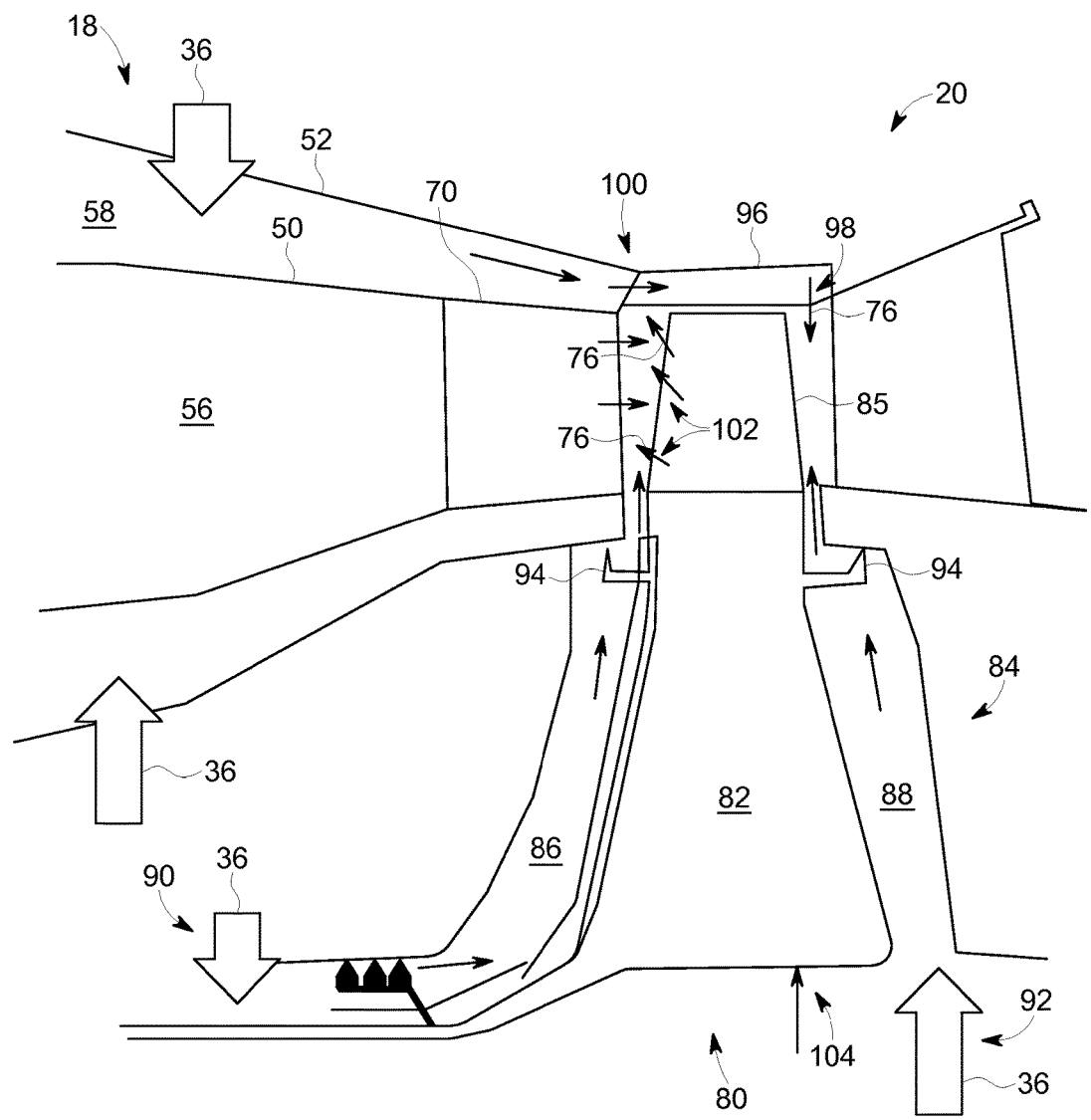
FIG. 3 is a schematic cross-sectional illustration of an exemplary high-pressure turbine that may be used with the turbine assembly shown in FIG. 1.

FIG. 3 is a schematic cross-sectional illustration of high pressure turbine 20 that may be used with turbine assembly 10 (shown in FIG. 1). In the exemplary embodiment, high pressure turbine 20 includes a rotor assembly 80 including a rotor wheel 82 positioned within a wheelspace 84, and at least one rotor blade 85 extending from rotor wheel 82. Wheelspace 84 includes first cavity 86 and a second cavity 88 defined on opposing sides of rotor wheel 82. In one embodiment, treatment system 34 (shown in FIG. 1) channels at least a portion of the flow of treated exhaust gas 36 towards wheelspace 84 to continuously purge fluid within wheelspace 84. More specifically, a first portion 90 of treated exhaust gas 36 is used to purge fluid within first cavity 86, and a second portion 92 of treated exhaust gas 36 is used to purge fluid within second cavity 88. Purging fluid within wheelspace 84 facilitates ensuring wheelspace 84 and components contained therein remain cool during operation of gas turbine engine 12 (shown in FIG. 1). Moreover, using treated exhaust gas 36 to purge fluid within wheelspace 84 ensures any fluid discharged towards the hot gas path past angel wing seals 94 does not prematurely degrade hot gas path components.

Also shown in FIG. 3 is film cooling embodiments for additional hot gas path components. For example, treated exhaust gas 36 is channeled through outer combustor casing 52 such that treated exhaust gas 36 flows within radially outer passage 58 towards a shroud 96 positioned radially outward from rotor blade 85. Shroud 96 includes a plurality of third cooling holes 98 for channeling treated exhaust gas 36 therethrough. More specifically, a shroud inlet 100 couples third cooling holes 98 in flow communication with radially outer passage 58, and pressurized fluid jets 76 discharged from third cooling holes 98 form a protective film over shroud 96. In addition, treated exhaust gas 36 is channeled through rotor wheel 82 for discharge through a plurality of fourth cooling holes 102 defined within rotor blade 85. More specifically, treated exhaust gas 36 is channeled through a rotor wheel inlet 104, and pressurized fluid jets 76 discharged from fourth cooling holes 102 form a protective film over rotor blade 85.

Referring to FIGS. 2 and 3, while shown as providing film cooling for combustor liner 50, nozzle 70, rotor blade 85, and shroud 96, treatment system 34 may selectively provide treated exhaust gas 36 to one or more than one hot gas path component, each at predetermined flow rates.

Figure 4:
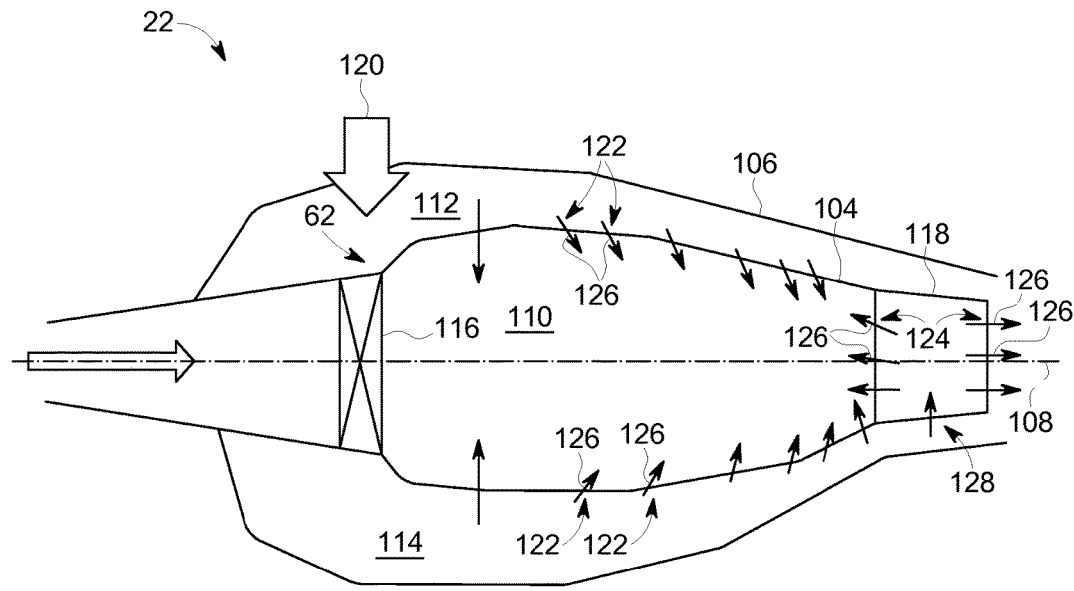
FIG. 4 is a schematic cross-sectional illustration of an exemplary lean burn combustor that may be used with the turbine assembly shown in FIG. 1.

FIG. 4 is a schematic cross-sectional illustration of lean burn combustor 22 that may be used with turbine assembly 10 (shown in FIG. 1). In the exemplary embodiment, lean burn combustor 22 includes a combustor liner 104 positioned within an outer combustor casing 106. Combustor liner 104 extends circumferentially about centerline 30 (shown in FIG. 1) of lean burn combustor 22 such that a combustion chamber 110 is defined therein. Moreover, outer combustor casing 106 extends circumferentially about centerline 30 such that a radially outer passage 112 and a radially inner passage 114 are defined between combustor liner 104 and outer combustor casing 106. Annular dome assembly 62 extends between, and is coupled to, combustor liner 104. A premixer 116 receives the flow of combusted gas having excess fuel from rich burn combustor 18 (shown in FIG. 2). The flow of combusted gas is discharged into combustion chamber 110, and is combusted such that the excess fuel in the flow of combusted gas is spent. A flow of combusted gas discharged from lean burn combustor 22 and having a depleted oxygen content is then channeled past a nozzle 118 before being channeled towards low pressure turbine 24 (shown in FIG. 1).

In the exemplary embodiment, lean burn combustor 22 receives a flow of compressor bleed air 120 from high pressure compressor 16 (shown in FIG. 1) to provide film cooling for hot gas path components within lean burn combustor 22, and to dilute the flow of combusted gas within combustion chamber 110. Bleed air 120 contains oxygen, which facilitates combusting the unburned fuel channeled from rich burn combustor 18. More specifically, combustor liner 104 includes a plurality of fifth cooling holes 122 for channeling compressor bleed air 120 therethrough, and nozzle 118 includes a plurality of sixth cooling holes 124 for channeling compressor bleed air 120 therethrough. Fifth cooling holes 122 are coupled in flow communication with radially outer and inner passages 112 and 114 such that pressurized fluid jets 126 of compressor bleed air 120 are discharged from fifth cooling holes 122 into combustion chamber 110, and such that a protective film (not shown) formed from pressurized fluid jets 126 is formed over combustor liner 104. In one embodiment, a nozzle inlet 128 couples sixth cooling holes 124 in flow communication with radially outer and inner passages 112 and 114. Pressurized fluid jets 126 discharged from sixth cooling holes 124 likewise form a protective film over nozzle 118. Because lean burn combustor 22 generally operates at a lower firing temperature than rich burn combustor 18 (shown in FIG. 2), components of lean burn combustor 22 may be formed from metallic materials, which enables compressor bleed air 120 to be used for cooling purposes therein. In an alternative embodiment, components of lean burn combustor 22 may be formed from CMC material.

Figure 5:
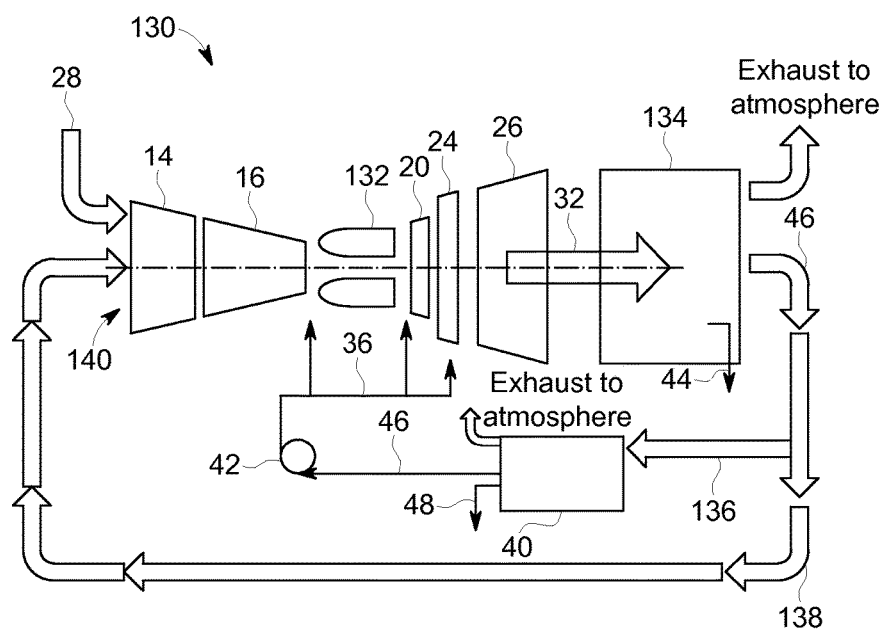
FIG. 5 is a schematic illustration of an exemplary combined-cycle power generation system.

FIG. 5 is a schematic illustration of an exemplary combined-cycle power generation system 130. In the exemplary embodiment, combined-cycle power generation system 130 includes a combustor 132 positioned between high pressure compressor 16 and high pressure turbine 20, and a heat recovery steam generator 134 positioned downstream from power turbine 26. Heat recovery steam generator 134 is embodied as a portion of treatment system 34, and is positioned to receive the flow of exhaust gas 32 from gas turbine engine 12. Heat recovery steam generator 134 cools the flow of exhaust gas 32 such that a flow of water 44 condensed from the flow of exhaust gas 32, and a flow of cooled exhaust gas 46 having a depleted water content is discharged therefrom. A first portion 136 of the flow of cooled exhaust gas 46 is channeled towards carbon dioxide removal unit 40, and a second portion 138 of the flow of cooled exhaust gas 46 is channeled towards a compressor inlet 140 of low pressure compressor 14. Channeling the oxygen and water depleted flow of cooled exhaust gas 46 towards compressor inlet 140 facilitates controlling the oxygen content in combustor 132 to reduce the formation of oxides of nitrogen.

The systems and methods described herein relate to film cooling hot gas path components. More specifically, the systems and methods describe a turbine assembly that provides an intrinsic fluid source that, after one or more treatment steps, can be utilized for film cooling of hot gas path components formed at least partially from ceramic matrix composite material. The fluid source may also be used to control the oxygen content in a gas turbine to reduce the formation of oxides of nitrogen. As such, the systems and methods described herein facilitate increasing the thermal efficiency of the gas turbine.

An exemplary technical effect of the system and methods described herein includes at least one of: (a) providing a source of film cooling fluid more beneficial for use with ceramic matrix composite material; (b) enabling a gas turbine to operate at greater firing temperatures; and (c) improving the efficiency of a gas turbine.

Exemplary embodiments of a gas turbine engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only gas turbine engines and related methods as described herein. Rather, the exemplary embodiment can be implemented and utilized in connection with many applications where improving engine performance is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine assembly comprising:
    a gas turbine engine comprising a rich burn combustor configured to combust an air-fuel mixture having excess fuel such that a flow of combusted gas having a depleted oxygen content is discharged therefrom and a lean burn combustor positioned downstream from said rich burn combustor, said lean burn combustor configured to combust the excess fuel in the flow of combusted gas such that the flow of exhaust gas discharged from said gas turbine engine has a depleted oxygen content, wherein at least one hot gas path component of each of the rich burn combustor and the lean burn combustor is formed at least partially from a ceramic matrix composite material; and
    a treatment system positioned to receive the flow of exhaust gas from said gas turbine engine, said treatment system configured to remove water from the flow of exhaust gas to form a flow of treated exhaust gas, and to channel the flow of treated exhaust gas directly into each of the rich burn combustor and the lean burn combustor towards said at least one hot gas path component of each of the rich burn combustor and the lean burn combustor,
    wherein said at least one hot gas path component comprises a plurality of cooling holes for channeling the flow of treated exhaust gas therethrough, such that a protective film is formed over said at least one hot gas path component.

2. The turbine assembly in accordance with claim 1, wherein said at least one hot gas path component comprises at least one of a combustor liner and a nozzle.

3. The turbine assembly in accordance with claim 1, wherein said gas turbine engine further comprises a wheelspace and a rotor assembly comprising a rotor wheel positioned within said wheelspace, said treatment system further configured to channel the flow of treated exhaust gas towards said wheelspace to continuously purge fluid within said wheelspace.

4. The turbine assembly in accordance with claim 3, wherein said rotor assembly comprises at least one second hot gas path component formed at least partially from a ceramic matrix composite material and the at least one second hot gas path component comprises at least one of a rotor blade and a shroud.

5. The turbine assembly in accordance with claim 1, wherein said treatment system comprises a heat exchanger configured to cool the flow of exhaust gas such that a flow of water condensed from the flow of exhaust gas and a flow of cooled exhaust gas is discharged from said heat exchanger.

6. The turbine assembly in accordance with claim 5, wherein said gas turbine engine comprises a compressor inlet configured to receive a portion of a flow of cooled exhaust gas from said heat exchanger.

7. The turbine assembly in accordance with claim 1, wherein said treatment system comprises a carbon dioxide removal unit configured to remove carbon dioxide from the flow of exhaust gas.

8. A combined-cycle power generation system comprising:
    a gas turbine engine comprising a rich burn combustor configured to corn bust an air-fuel mixture having excess fuel such that a flow of corn busted gas having a depleted oxygen content is discharged therefrom and a lean burn combustor positioned downstream from said rich burn combustor, said lean burn combustor configured to corn bust the excess fuel in the flow of corn busted gas such that the flow of exhaust gas discharged from said gas turbine engine has a depleted oxygen content, wherein at least one hot gas path component of each of the rich burn combustor and the lean burn combustor is formed at least partially from a ceramic matrix composite material; and a heat recovery steam generator positioned to receive the flow of exhaust gas discharged from said gas turbine engine, said heat recovery steam generator configured to:

cool the flow of exhaust gas such that a flow of water condensed from the flow of exhaust gas and a flow of cooled exhaust gas is discharged from said heat recovery steam generator; and channel the flow of cooled exhaust gas directly into each of the rich burn combustor and the lean burn combustor towards said at least one hot gas path component of each of the rich burn combustor and the lean burn combustor, wherein said at least one hot gas path component comprises a plurality of cooling holes for channeling the flow of cooled exhaust gas therethrough, such that a protective film is formed over said at least one hot gas path component.

9. The system in accordance with claim 8, further comprising a wheelspace and a rotor assembly comprising a rotor wheel positioned within said wheelspace, said heat recovery steam generator further configured to channel the flow of treated exhaust gas towards said wheelspace to continuously purge fluid within said wheelspace, wherein said rotor assembly comprises at least one second hot gas path component formed at least partially from a ceramic matrix composite material and the at least one second hot gas path component comprises at least one of a rotor blade and a shroud.

10. The system in accordance with claim 8, wherein said at least one hot gas path component comprises at least one of a combustor liner and a nozzle.

11. The system in accordance with claim 8, wherein said gas turbine engine comprises a compressor inlet configured to receive a portion of a flow of cooled exhaust gas from said heat recovery steam generator.

12. The system in accordance with claim 8 further comprising a carbon dioxide removal unit configured to remove carbon dioxide from the flow of cooled exhaust gas.

13. A method, comprising:

positioning a treatment system to receive a flow of exhaust gas from a gas turbine engine, the gas turbine engine including a rich burn combustor configured to combust an air-fuel mixture having excess fuel such that a flow of combusted gas having a depleted oxygen content is discharged therefrom and a lean burn combustor positioned downstream from said rich burn combustor, said lean burn combustor configured to combust the excess fuel in the flow of combusted gas such that the flow of exhaust gas discharged from said gas turbine engine has a depleted oxygen content, wherein at least one hot gas path component of each of the rich burn combustor and the lean burn combustor is formed at least partially from a ceramic matrix composite material and having a plurality of cooling holes defined therein, wherein the treatment system is configured to remove water from the flow of exhaust gas to form a flow of treated exhaust gas; and coupling the treatment system in flow communication with the at least one hot gas path component such that a protective film is formed over the at least one hot gas path component when the flow of treated exhaust gas is channeled directly into each of the rich burn combustor and the lean burn combustor towards the at least one hot gas path component of each of the rich burn combustor and the lean burn combustor.

14. The method in accordance with claim 13, further comprising channeling the flow of treated exhaust gas towards a wheelspace and a rotor assembly comprising a rotor wheel positioned within said wheelspace to continuously purge fluid within said wheelspace, wherein said rotor assembly comprises at least one second hot gas path component formed at least partially from a ceramic matrix composite material and the at least one second hot gas path component comprises at least one of a rotor blade and a shroud.

15. The method in accordance with claim 13, wherein positioning a treatment system comprises positioning a heat exchanger downstream from the gas turbine engine, the heat exchanger configured to cool the flow of exhaust gas such that a flow of water condensed from the flow of exhaust gas and a flow of cooled exhaust gas is discharged from the heat exchanger.

16. The method in accordance with claim 15 further comprising coupling the treatment system in flow communication with a compressor inlet of the gas turbine engine such that at least a portion of the flow of cooled exhaust gas is channeled towards the compressor inlet.

17. The method in accordance with claim 13, wherein positioning a treatment system comprises positioning a carbon dioxide removal unit downstream from the gas turbine engine, the carbon dioxide removal unit configured to remove carbon dioxide from the flow of exhaust gas.

* * * * *